(No Model.)

G. L. HARVEY.
SIDING FOR BUILDINGS.

No. 423,050. Patented Mar. 11, 1890.

Witnesses.

Inventor,
George L. Harvey
By Offield & Towle
Attys.

UNITED STATES PATENT OFFICE.

GEORGE L. HARVEY, OF CHICAGO, ILLINOIS.

SIDING FOR BUILDINGS.

SPECIFICATION forming part of Letters Patent No. 423,050, dated March 11, 1890.

Application filed October 26, 1889. Serial No. 328,269. (No model.)

*To all whom it may concern:*

Be it known that I, GEORGE L. HARVEY, a citizen of the United States, residing at Chicago, in the county of Cook and State of Illinois, have invented certain new and useful Improvements in Sidings for Buildings, of which the following is a specification.

My invention relates to certain improvements in the construction of sidings or sheathings for buildings, whereby a suitable tight joint is maintained and leaking at the joint is prevented. To this end I provide the edges of the timbers with mating projecting portions formed by cutting away one corner of the timber on a re-entrant angle and bevel or cut away the face of the timber inwardly from the edge. I also provide, by preference, a channel or passage to carry off water which may find its way through the straight portion of the joint by grooving the beveled part of one of the interlocking projections.

Figure 1:
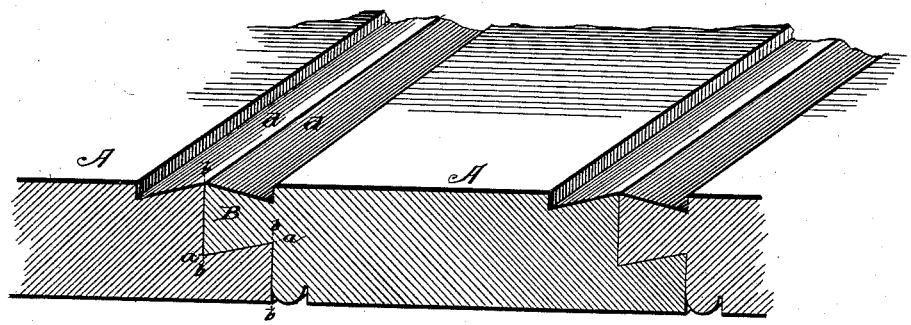
Figure 2:
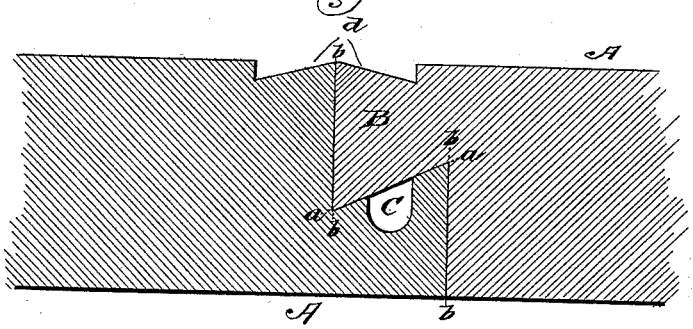
Figure 3:
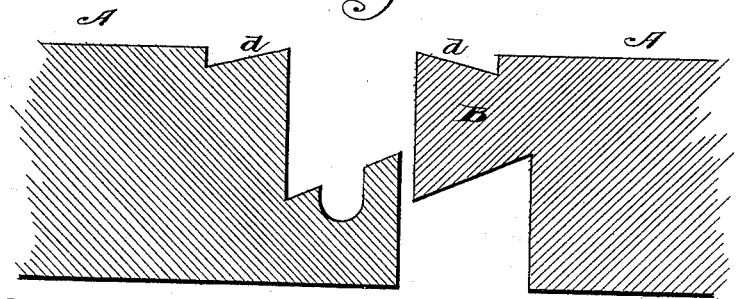

In the accompanying drawings, Figure 1 is a perspective view of parts of three timbers, which are joined together according to my invention. Fig. 2 is a cross-section through the joint between two of such timbers, and showing a channel below the joint to carry off water which may find access thereto. Fig. 3 shows the timbers separated from each other.

In the drawings, A represents the several timbers, which may be of any desired width or thickness, and which are used generally in siding or sheathing buildings, and in such use are either secured vertically or diagonally to stringers or joists. Each of these timbers will be provided on its edge with a dovetailed projection, the substance of which is marked B, and which is formed by cutting away a corner of the timber on the lines $a\ a$ and $b\ b$, which form an acute or re-entrant angle. The opposite edge of said timber has its opposite corner correspondingly cut away, and thereby it is adapted to mate with other timbers similarly formed, as shown in the several views of the drawings. These provisions not only effect a secure joint having little tendency to separate or open, but also result in closing or tightening the joint when the material shrinks. This will be fully understood by supposing that the parts A (shown in Fig. 2, for example) be drawn away for each other laterally by the shrinkage of the material. In such case the meeting surfaces on the line $a$ $a$ being inclined planes, the effect will be to retard the shrinkage and more tightly close the joint.

In order to carry off any water which may find its way through the straight portion of the joint, I provide a channel or passage C by grooving the beveled side of one of the projections B, and thereby any water which finds its way through one of the straight seams will be carried out of the channel before passing to the other straight seam.

To prevent the water from passing readily into the straight portion of the joint from the outer side of the timber, I cut away the faces of the timbers or bevel them inwardly from the edge of the face, as shown at $d\ d$. This material may be used for roofing and for walls and partitions generally.

I claim—

1. The herein-described siding or sheathing material, consisting of a timber having each of its edges provided with a projecting portion formed by cutting away one corner thereof on a re-entrant angle and its face beveled inwardly from the edge, substantially as described.

2. The herein-described improvement in siding or sheathing material, which consists in providing each of said timbers on one of its edges with a projection formed by cutting away one corner of the timber on a re-entrant angle, and with a longitudinal groove in the inclined face of said projection, substantially as described.

GEORGE L. HARVEY.

Witnesses:
E. L. HUBER,
N. M. BOND.